United States Patent [19]
Moran et al.

[11] Patent Number: 5,984,139
[45] Date of Patent: Nov. 16, 1999

[54] HANDLE-ACTUATED INSULATED AIR POT LIQUID DECANTER

[75] Inventors: Jorge E. Moran; Gary L. Lowrey, both of Nashville, Tenn.; Jon Conway, Olive Branch; Greg Bigham, Hernando, both of Miss.; Paul Bartholomew, Memphis, Tenn.

[73] Assignee: Megatrade International, Inc., Nashville, Tenn.

[21] Appl. No.: 09/126,850

[22] Filed: Jul. 31, 1998

[51] Int. Cl.$^6$ ........................................... B67B 7/00
[52] U.S. Cl. .............................. 222/1; 222/131; 222/209; 222/401
[58] Field of Search ..................... 222/209, 401, 222/131, 321.8, 509, 1

[56] References Cited

U.S. PATENT DOCUMENTS

| | | | |
|---|---|---|---|
| 4,174,053 | 11/1979 | Shimizu | 222/209 |
| 4,310,104 | 1/1982 | Takatsuki | 222/131 |
| 4,359,174 | 11/1982 | Ikunosuke et al. | 222/131 |
| 4,767,032 | 8/1988 | Smith | 222/401 X |

*Primary Examiner*—Gregory L. Huson
*Attorney, Agent, or Firm*—Arent Fox Kintner Plotkin & Kahn, PLLC

[57] ABSTRACT

An air pressurized liquid decanter is disclosed, which is generally comprised of a pump unit, an external handle, an insulated container body which includes an interior vessel and a base unit. The pump unit is contained within a pump housing which has radially disposed apertures. A cam shaft residing within the pump housing extends through the horizontally disposed apertures and is affixed in rotatable engagement to the external handle. The cam shaft is maintained in mechanical communication with a vertically-movable check valve residing within the pump housing. The vertically-movable check valve is, in turn, placed in mechanical communication with a support disk residing within the pump housing. The support disk overlays a flexible bellows unit, which has an open upper end in atmospheric communication with the vertically-movable check valve and pump housing. The flexible bellows unit also has an open lower end in atmospheric communication with a bulkhead, and with the insulated container body. The bulkhead is maintained in sealing engagement with the interior vessel of the insulated container body and has a plurality of valves permitting selective atmospheric communication between said bellows unit and the interior vessel. A spout and hollow tube are maintained in sealing engagement with the bulkhead. The free end of the hollow tube extends into the insulated container body, thus establishing fluid communication between the insulated container body, the bulkhead and the hollow spout.

15 Claims, 6 Drawing Sheets

HANDLE-ACTUATED INSULATED AIR POT LIQUID DECANTER

BACKGROUND OF THE INVENTION

The present invention relates to a unique handle-actuated, insulated air pot liquid decanter, which is compact, light-weight and easily transportable. This new liquid decanter allows the user to dispense liquids from an insulated container or vacuum flask through use of an internal pumping mechanism which is actuated by the rotation of the decanter's external handle. The handle-actuated, insulated air pot liquid decanter finds particular utility by providing the user with a relatively low cost, easily manufactured, insulated liquid decanter which safely transports and dispenses hot and cold liquids and whose pumping mechanism is easier to use than those employed by prior devices.

The present invention allows a consumer to utilize known air pot technologies with much less effort and safety than is the case with prior insulated liquid decanters. There currently exist a number of proposed insulated air pot decanters which utilize a pumping mechanism to dispense liquid from a container into a user's beverage cup. Most, if not all, such prior air pot liquid decanters utilize an "in-line button" to depress an internal bellows unit, which injects pressurized air into the insulated container vessel in order to displace the liquid residing therein through a hollow tube and spout into a user's beverage cup.

The use of an in-line button assembly requires the user to exert a significant amount of force in order to depress the internal bellows unit and obtain a decanting of the liquid. Therefore, the in-line button cannot be easily or safely used on all types of surfaces, by all types of persons. In addition, the force necessary to depress the in-line button found on most existing air pot liquid decanters usually requires the user to be in close proximity to the decanter itself. Moreover, the user of existing in-line button air pots is often hard pressed to adequately control the amount or velocity of the liquid flow. These factors create a safety concern, especially when hot liquids are being decanted, since splattering, or an overflow of a beverage cup, can burn the user or other bystanders, in addition to causing spillage.

The present handle-actuated, insulated air pot liquid decanter avoids the shortcomings found in these prior art devices. For instance, the mechanical advantage obtained by actuating the decanter's air pot pumping mechanism through use of its external handle is considerable. It is estimated that the handle lever mechanism used by the present invention requires three (3) to four (4) times less force from the user to pump liquid from the insulated decanter than do existing in-line button air pots. Therefore, the present invention can be utilized effectively and safely on a variety of surfaces by a wider variety of persons. The user does not always have to be in close proximity to the device, which can prevent injury caused by the splatter of hot liquids or the over-filling of beverage containers. In addition, the fact that less force is necessary to use the handle actuated insulated air pot decanter also means that the user can better control the amount and velocity of the flow of hot and cold liquids, thus increasing safety and reducing spillage.

The present invention also has several other advantages over prior insulated air pot liquid decanters. Many of the existing insulated air pot liquid decanters have no means of locking the pumping mechanism to prevent the unintended dispensing of hot or cold liquids, such as may occur during transport. The preferred embodiment of the handle-actuated, insulated air pot liquid decanter utilizes two distinct locking mechanisms which reduce spillage and render the present invention safe for transport and unattended storage. First, the pumping mechanism of the present invention is selectively engageable. In its preferred embodiment, the handle of the invention includes an integrally molded wide ring and elongated slot on each "leg" of the handle. When the pumping mechanism is disengaged, such as during transport, the cam shaft of the pumping mechanism rests on the wide rings of the handle, thus allowing the decanter to swing or move freely, without actuating the pumping mechanism. The pumping mechanism is engaged by placing downward pressure on the handle when it is in a vertical position, so that the pegs of the cam shaft cooperatively engage with the elongated groves in each "leg" of the handle. These grooves securely fasten the handle to the cam shaft, thus allowing the handle to rotate the cam shaft and actuate the pumping mechanism.

The second locking mechanism utilized by the preferred embodiment of the handle-actuated, insulated air pot liquid decanter consists of a plate which slides along a grove integrally molded into the top of the pump housing, until it engages with the cam shaft found in the pumping mechanism itself. In this way, the locking plate prevents the rotation of the cam shaft, and thus the inadvertent decanting of the liquid contained therein.

In addition, the present invention utilizes fewer and less complicated moving parts, and is thus easier and less costly to manufacture, maintain and use than many of the prior art devices.

SUMMARY OF THE INVENTION

It is therefore an object of the present invention to provide consumers with an inexpensive, efficiently manufactured, low maintenance, handle-actuated insulated air pot liquid decanter.

Another object of the present invention is to provide consumers with a unique insulated air pot liquid decanter whose internal pumping mechanism is actuated by the rotation of an external handle.

It is a further object of the invention to provide consumers with an insulated air pot liquid decanter whose use of a handle-actuated pumping mechanism requires significantly less force than required by existing insulated air pot liquid decanters.

It is an additional object of the invention to provide consumers with an insulated air pot liquid decanter whose handle-actuated pumping mechanism allows the user to better control the amount and velocity of liquid flow from the decanter, so as to prevent injury to the user and spillage of liquid from the container.

Still another object of the invention is to provide an insulated air pot liquid decanter with pump disengagement and locking mechanisms, which prevent the inadvertent or unintended decanting of hot or cold liquids during transport of the decanter or unattended storage of the decanter.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, the present invention is directed to a handle-actuated, insulated air pot liquid decanter comprising a pump unit which is contained within a pump housing with radially disposed apertures. The general structure of the present invention also includes an external handle, an insulated container body and a base unit. The insulated container body includes a top surface, a bottom surface, an interior vessel and exterior surface. The insulated container body may be comprised a rigid, hollow vessel surrounding an insulating material, or a rigid, hollow vessel surrounding a standard double-walled silvered glass vacuum bottle. The base unit affixed to said bottom surface of the insulated container body by counterposing screw threads, and includes a flexible, shock absorbing plug assembly which is in mechanical engagement with the double walled vacuum bottle and the base unit. The pump housing is attached to the top surface of the insulated container body, and has a plurality of apertures radially disposed about its circumference. The external handle is affixed to the exterior of the pump housing in alignment with the plurality of apertures.

The pump unit is contained within, and is surrounded, by the pump housing. The pump unit comprises a cam shaft whose opposing ends extend laterally through the radially disposed apertures of the pump housing and are affixed in rotatable engagement to the external handle. The external handle can be securely affixed to the cam shaft by a plurality of hollow, grooved clips, which attach to pegs integrally molded to opposing ends of the cam shaft. The cam shaft may consist of a two-piece assembly, where the first piece of the two-piece assembly includes an integral shaft which is inserted into a slot integrally molded into the second piece of the two-piece cam shaft assembly. In addition, an arcuate plate may be eccentrically affixed to the cam shaft.

A check valve is maintained in mechanical communication with the cam shaft, such that the check valve is vertically movable when depressed by the cam shaft. A support disk with a central aperture into which said check valve is affixed is included in the pump unit. The placement of the check valve into the central aperture of the supports allows vertical movement of said check valve when the check valve is depressed by the cam shaft. The check valve includes a plurality of spaced-apart legs, such that when the check valve is extended in an open position, the spaced-apart legs allow free atmospheric communication between the bellows unit and the pump housing. Conversely, when the vertically-movable check valve is fully depressed into the central aperture of the support plate by the rotation of the cam shaft, such atmospheric communication is restricted.

A bulkhead is maintained in sealing engagement with the interior vessel of the insulated container body and has a plurality of valves permitting atmospheric communication with the interior vessel. A flexible bellows unit is included as a component of the pump unit. The flexible bellows unit has a top surface in mechanical communication with the support disk, a bottom surface in mechanical communication with the bulkhead and a flexible body. The top surface of the flexible bellows unit includes an open upper end in atmospheric communication with the check valve and the pump housing. The bottom surface of the flexible bellows unit has an open lower end in atmospheric communication with the interior vessel of the insulated container body through a plurality of valves in the bulkhead.

A hollow spout in affixed sealing engagement with the bulkhead. The hollow spout is surrounded by an elongated spout housing integrally molded into, and extending horizontally from, the pump housing. A hollow tube having a first and a second end is also included in the pump unit. The first end of the hollow tube is affixed in sealing engagement with the bulkhead and the second end extends into the interior vessel of the insulated container body permitting the flow of fluid from the interior vessel of the insulated container body, through the bulkhead and the hollow spout.

The handle-actuated, insulated air pot liquid decanter also utilizes two unique methods to prevent the inadvertent or unintended dispensing of hot or cold liquids. The first method utilizes a lock plate in slidable engagement with a groove track integrally molded into the top planar surface of the pump housing. The lock plate moves across the integral groove track and mechanically engages with the cam shaft, thus preventing rotational movement of the cam shaft and actuation of the pumping mechanism.

The second method utilized by the insulated air pot liquid decanter to prevent inadvertent or unintended dispensing includes a contiguous rounded and elongated slot which is integrally molded into each arm of the external handle. When the external handle is fully extended, such as when the decanter is being carried by the user, the cam shaft pegs rest upon, and freely move within, the rounded slot, thus preventing the actuation of the pumping mechanism. The pumping mechanism is engaged by depressing the handle to slide the elongated slots onto the pegs of the cam shaft.

DETAILED DESCRIPTION OF THE PREFERRED EMBODIMENT

Figure 1:
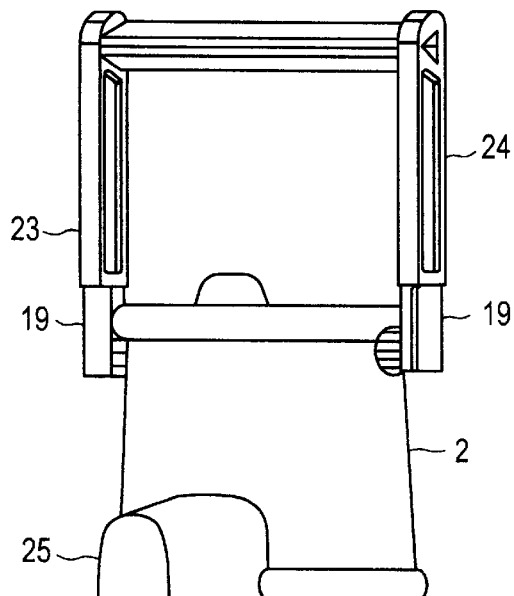
FIG. 1 illustrates a front elevational view of the Handle-Actuated Insulated Air Pot Liquid Decanter of the present invention.
Figure 2:
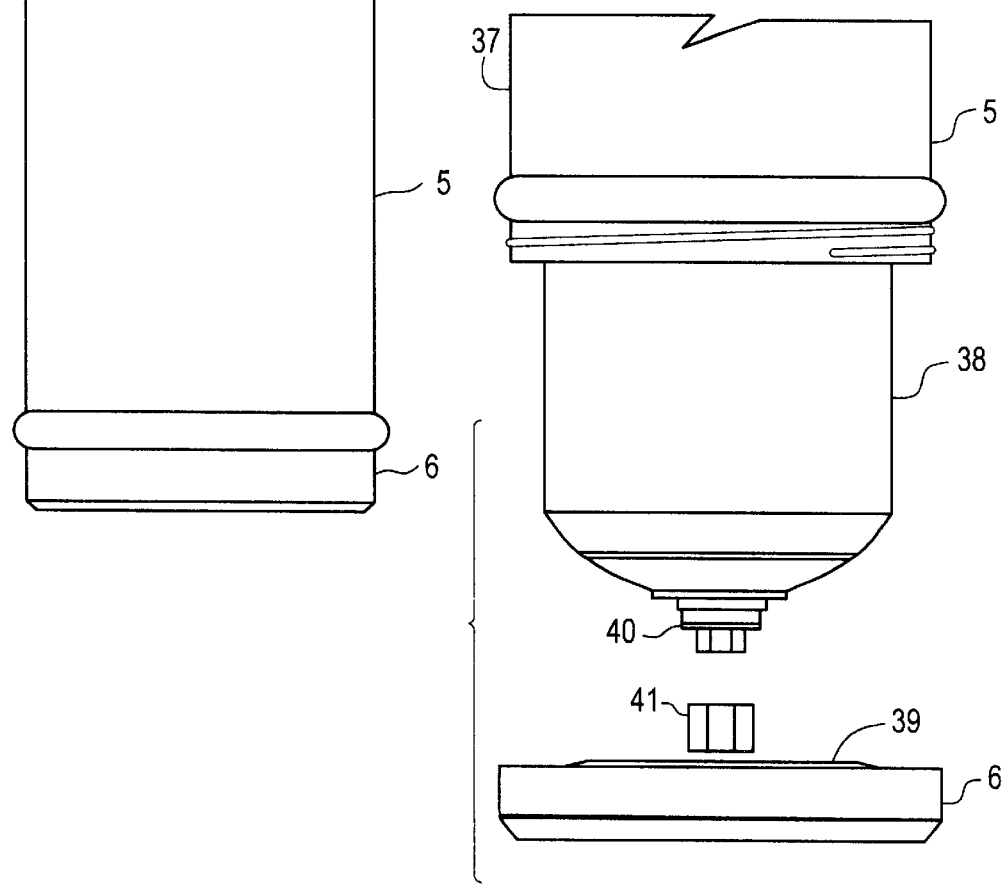
FIG. 2 illustrates a truncated, exploded elevational view of the insulated container body, double-walled glass vacuum container, shock-absorbing plug assembly and base unit.
Figure 3:
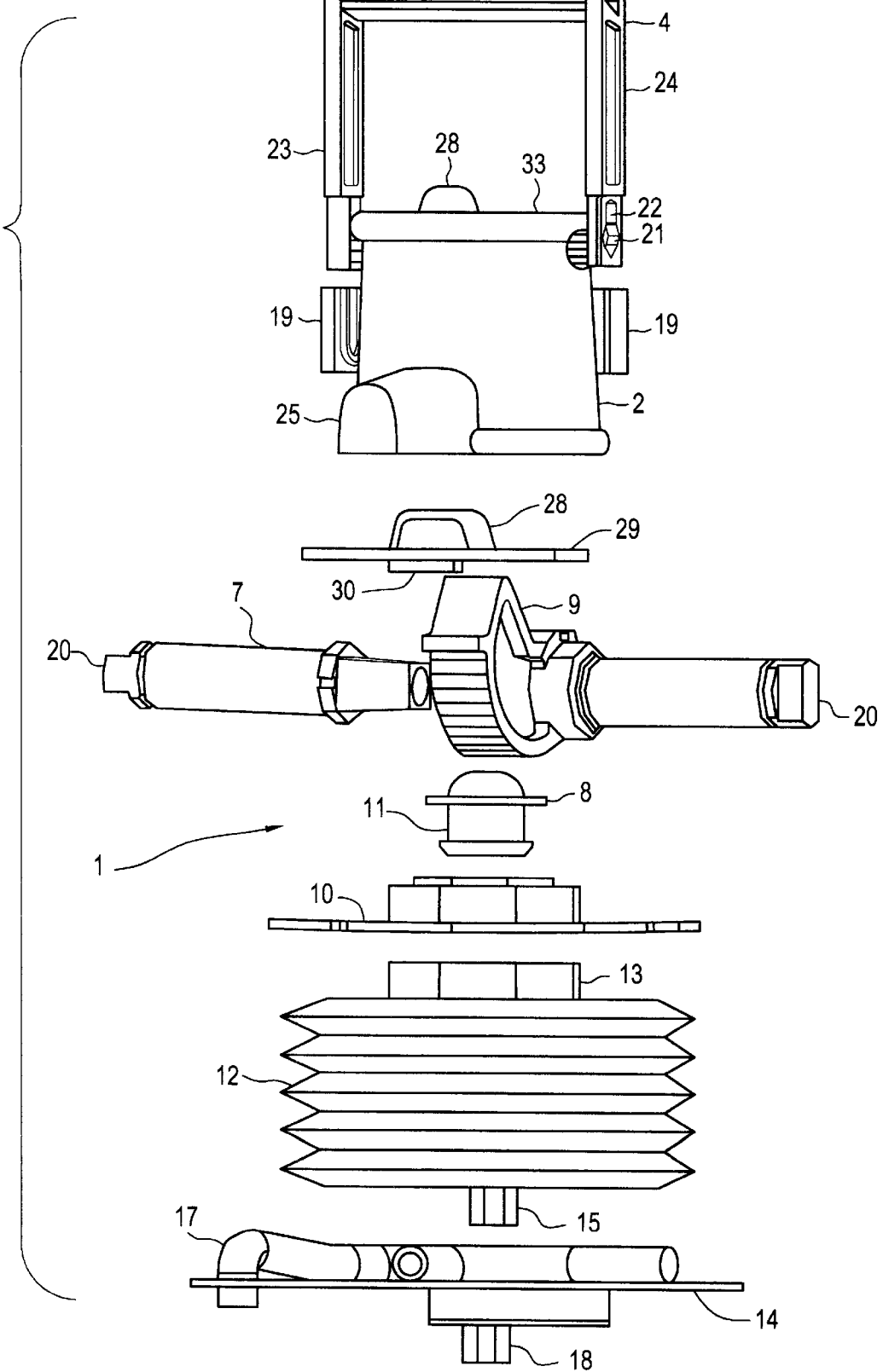
FIG. 3 illustrates an exploded front elevational view of the external handle, pump housing and pump assembly of the air pot liquid decanter of the present invention.

Referring to FIGS. 1, 2 and 3, the preferred embodiment of the handle-actuated, air pressurized liquid decanter is comprised of a pump unit 1, which includes a pump housing 2 with radially disposed apertures 3; an external handle 4; an insulated container body 5; and a base unit 6. The insulated container body 5 may be of several constructions well-known in the art. For example, in the preferred embodiment, the insulated container body 5 is comprised of a rigid, hollow vessel surrounding an evacuated, double-walled glass vacuum bottle 38. In an alternative embodiment, the container body 5 may be comprised of a rigid, hollow vessel surrounding an insulating material, such as Styrofoam (not shown). The base unit 6 is comprised of a rigid body unit 39, and may also include a flexible, shock absorbing plug assembly 40 and 41, which is in mechanical engagement with the double walled vacuum bottle 38 and the base unit 6 about the rigid body unit 39.

In the preferred embodiment of the present invention, as shown in FIG. 3.the external handle 4 is attached, in rotatable engagement, to an internal cam shaft 7, about a plurality of pegs 20 that are integrally molded to its opposing ends. The external handle 4 engages the plurality of pegs 20 at the rounded slots 21 or elongated slots 22 integrally molded into the arms 23 and 24 of the external handle 4. The external handle 3 is then secured to the plurality of pegs 20 on opposing ends of the cam shaft 7 by a plurality of hollow clips 19. The hollow clips 19 in turn include a plurality of grooves 25 integrally molded therein to cooperatively engage the plurality of pegs 20.

Figure 4:
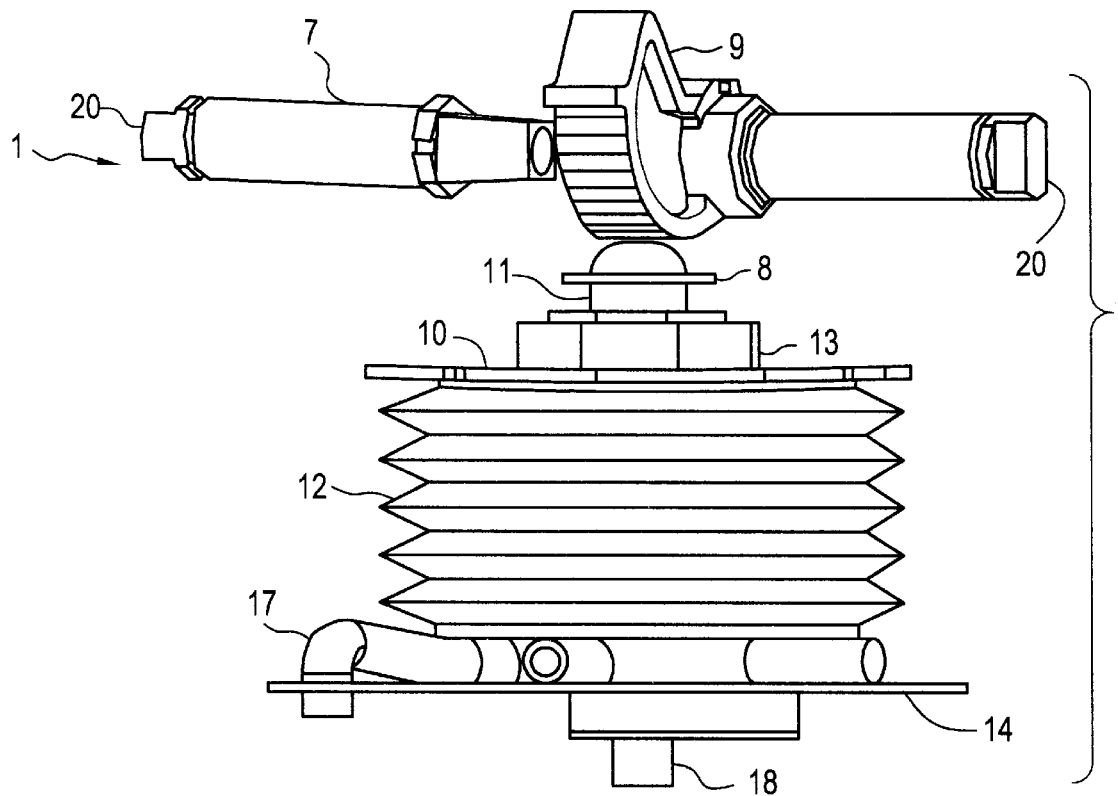
FIG. 4 illustrates a side-elevational view of the pump assembly of the air pot liquid decanter of the present invention.
Figure 5:
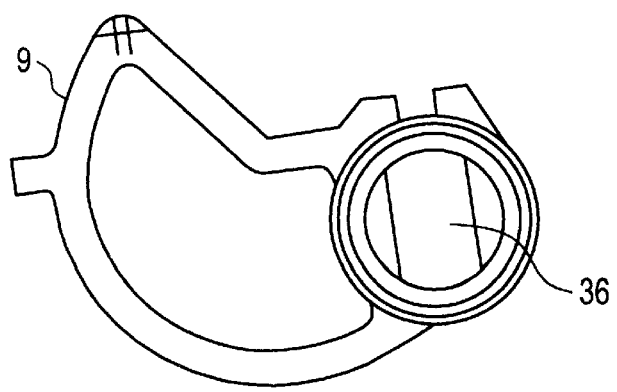
FIG. 5 illustrates a cross sectional view of the cam shaft and arcuate plate assembly of the air pot liquid decanter of the present invention.

Referring now to FIGS. 3, 4, 5, 8, and 11 the pump unit 1 consists of several distinct components. A cam shaft 7 resides within the pump housing 2 and whose opposing ends are inserted through the apertures 3. The cam shaft 7 may be of a single-piece or two-piece construction. In the case of a two-piece cam shaft 34, specific reference is made to FIGS. 5 and 11. The first piece of the two-piece cam shaft 34, the assembly, includes an integral block 35 which affixes to a slot 36 integrally molded into the second piece of the two-piece cam shaft 34. Referring to FIGS. 3 and 4, the cam shaft 7 extends through the pump housing 2 about radially disposed apertures 3 and is affixed in rotatable engagement to the external handle 4. In the preferred embodiment of the present invention, an arcuate plate 9 is eccentrically attached at the mid-point of cam shaft 7. A vertically-movable check valve 8, which includes a plurality of spaced-apart legs 11, resides within the pump housing 2, wherein the vertically-movable check valve 8 is in mechanical communication with the cam shaft 7. Such mechanical communication between the vertically movable check valve 8 and the cam shaft 7 is established at the arcuate plate 9.

A support disk 10 also resides within the pump housing 2 and is part of the pump unit 1. The support disk 10 is in mechanical communication with the plurality of spaced-apart legs 11 of the vertically-movable check valve 8. A flexible bellows unit 12 resides within the pump housing 2, which is in mechanical communication with the support disk 10. The support disk 10 overlays the open upper end 13 of flexible bellows unit 12. The open lower end 15 of flexible bellows unit 12 rests upon the bulkhead 14. The open upper end 13 of the flexible bellows unit 12 is in atmospheric communication with the pump housing 2 through the plurality of spaced-apart legs 11 of vertically-movable check valve 8. The open lower end 15 of the flexible bellows unit 12 is in atmospheric communication with the insulated container body 5, through the plurality of valves 16 included within the bulkhead 14.

Figure 6:
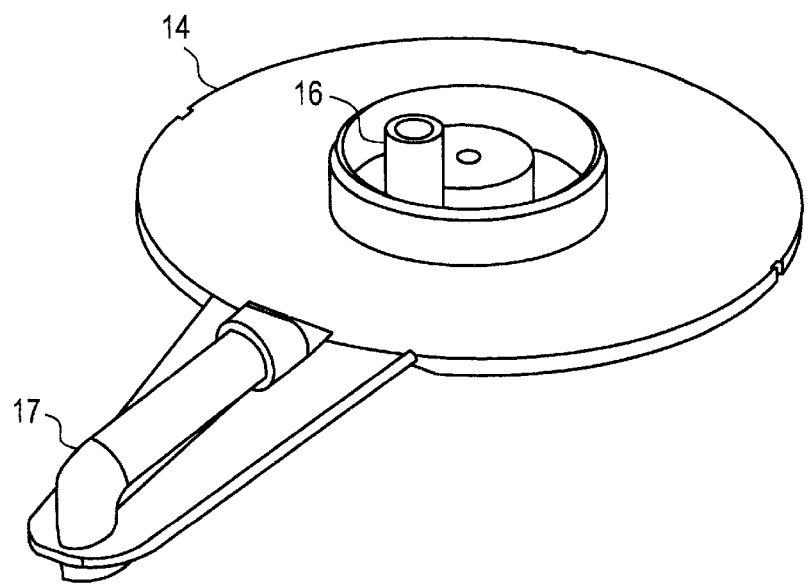
FIG. 6 illustrates a plan view of the bulkhead and hollow spout assembly of the air pot liquid decanter of the present invention.
Figure 7:
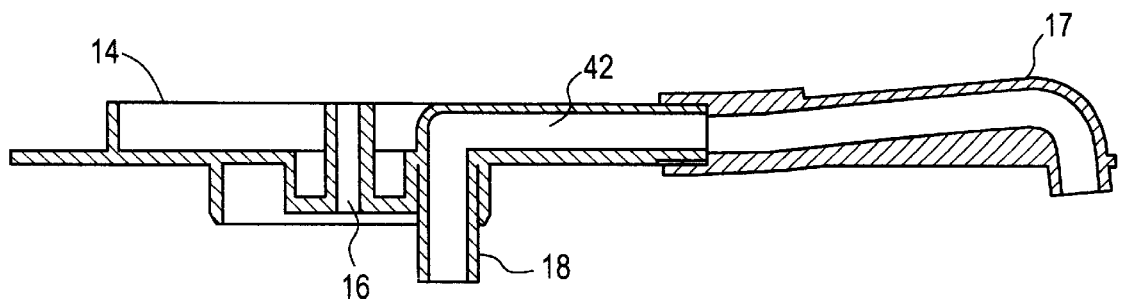
FIG. 7 illustrates a side elevational, cross-sectional view of the bulk head and hollow spout assembly of the air pot liquid decanter of the present invention.
Figure 8:
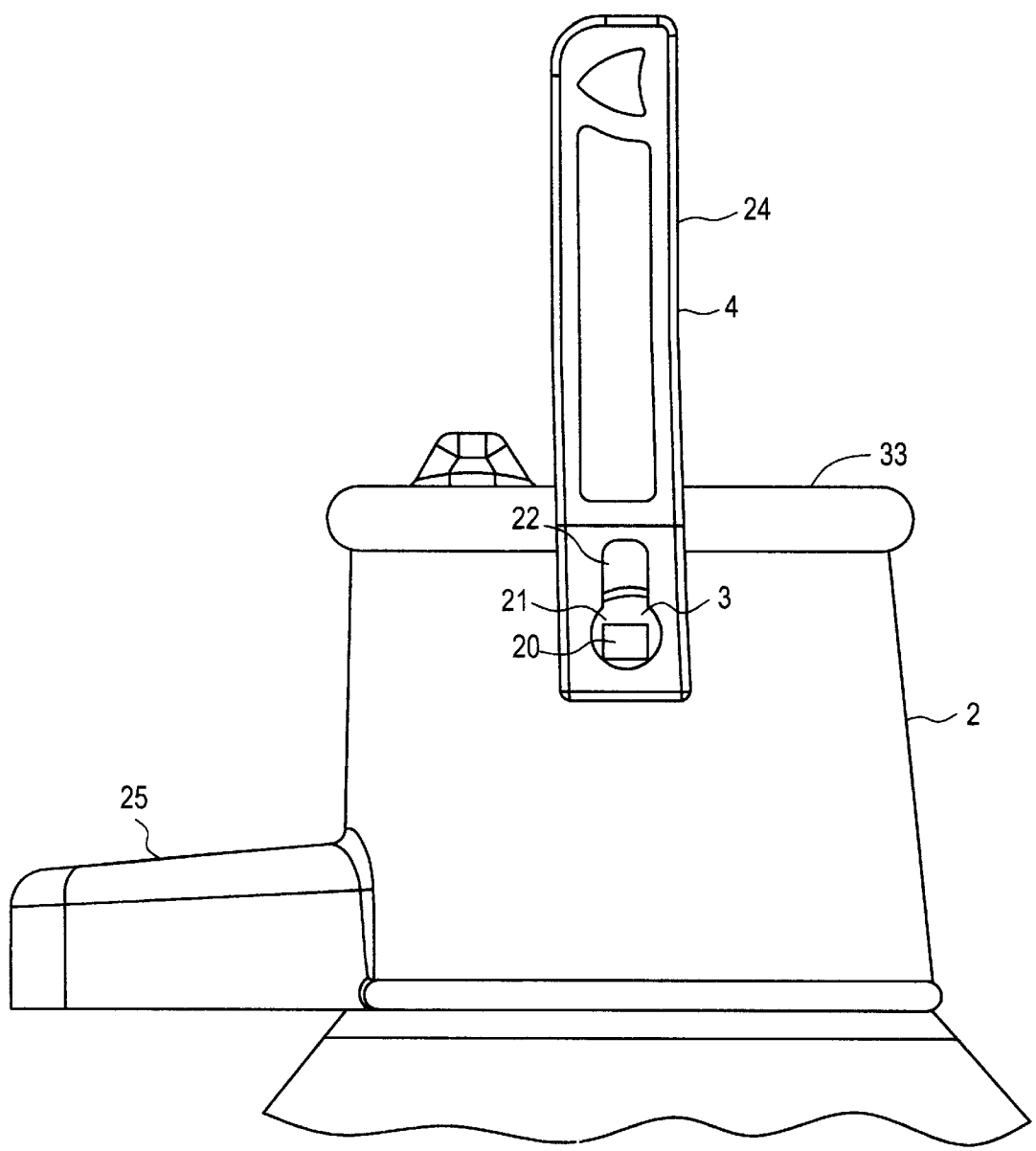
FIG. 8 is a side elevational view of the external handle, pump housing and cam shaft of the air pot liquid decanter of the present invention.
Figure 9:
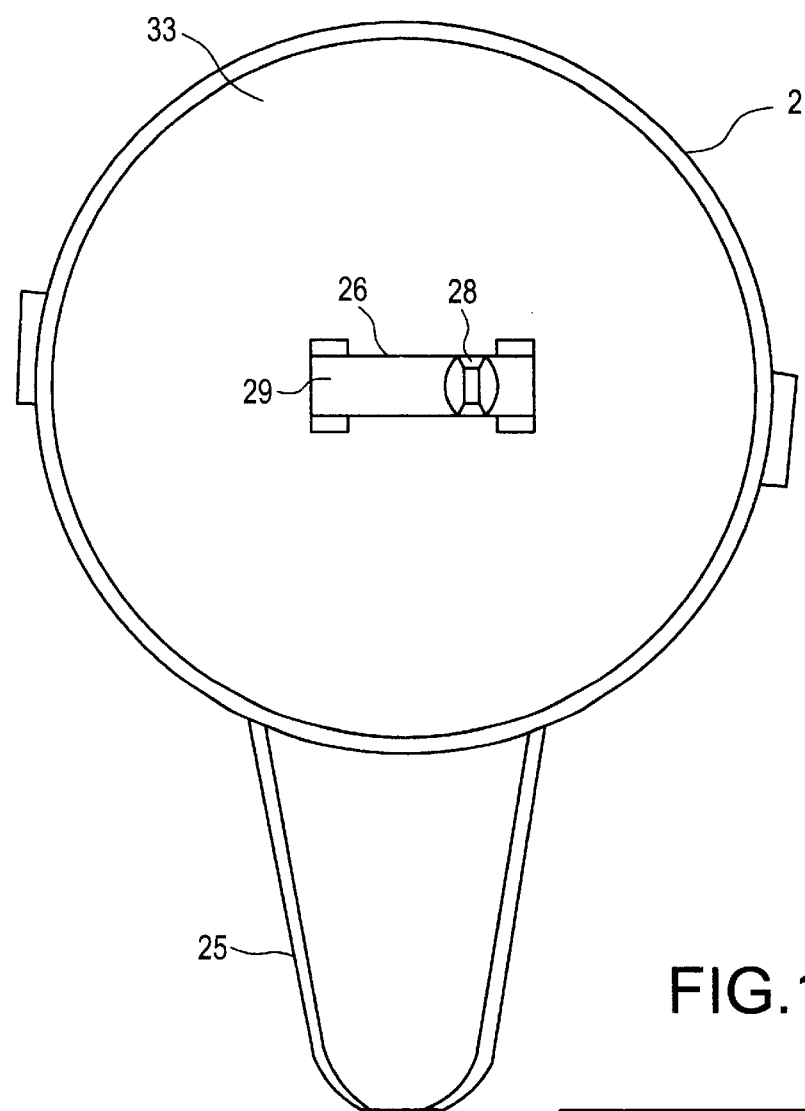
FIG. 9 is a top plan view of the pump housing and lock assembly of the air pot liquid decanter of the present invention.

Referring to FIGS. 6 and 7, the bulkhead 14 is maintained in sealing engagement with the insulated container body 5. The bulkhead 14 consists of a plurality of valves 16 permitting selective atmospheric communication between the flexible bellows unit 12 and the insulated container body 5. A hollow spout 17 is maintained in sealing engagement with the channel 42 of the bulkhead 14. A hollow tube 18 in also attached in sealing engagement to channel 42 of the bulkhead 14 at its first end. The second, free end of said hollow tube 18 extends into the insulated container body 5 in order to establish fluid flow through channel 42 between the insulated container body 5, the bulkhead 14 and the hollow spout 17 when pressurized air is injected into insulated container 5 by flexible bellows unit 12.

Figure 10:
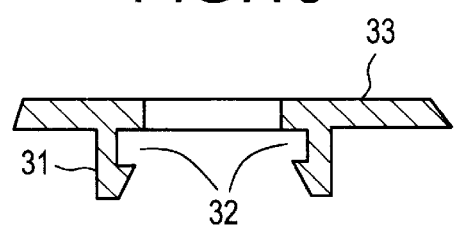
FIG. 10 is a truncated cross-sectional view of the lock assembly of the air pot liquid decanter of the present invention.
Figure 11:
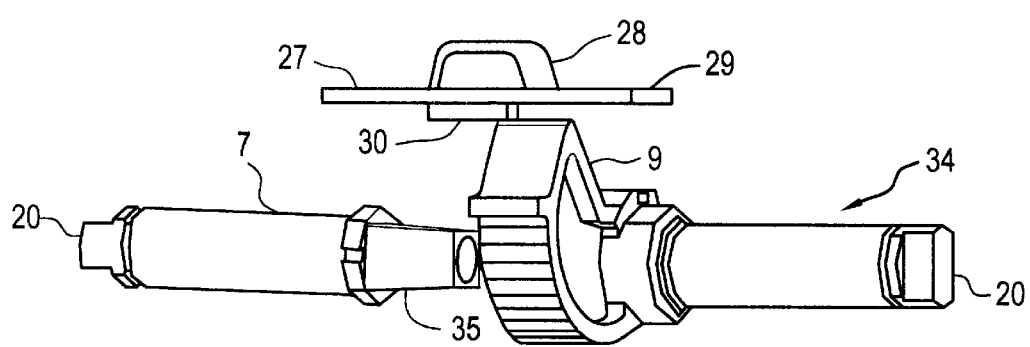
FIG. 11 is a side elevational view of the cam shaft and locking plate assembly of the air pot liquid decanter of the air pot liquid decanter of the present invention.

The structure of the preferred embodiment of the present invention is also comprised of a unique locking mechanism 26. Referring to FIGS. 3, 9, 10, 11, the locking mechanism 26 is comprised of a locking plate 27. The locking plate 27 is, in turn, comprised of a knob 28, a base 29, and a lock bolt 30. Referring specifically to FIG. 10, the lock plate 27 moves within track 31 that is integrally molded into the top plane 33 of pump housing 2, and which is comprised of a plurality of grooves 32 that form track 31. In order to engage the locking mechanism 26, the user grasps the knob 28 and move the lock plate 27 laterally along the track 31, until lock bolt 30 mechanically engages with arcuate plate 9, such that the rotation of the cam shaft 7 of the pump unit 1 is impeded, and the unintended or unwanted decanting of liquids housed within liquid container vessel 5 is prevented.

Referring now to FIGS. 1, 2 and 3, in the preferred embodiment of the handle-actuated, air pressurized liquid decanter, the pump unit 1 is actuated by the external handle 4, in order to dispense liquids into the user's beverage cup (not shown). When the liquid decanter of the present invention is not in use, the pumping unit 1 is disengaged to prevent the inadvertent or unintended decanting of the hot or cold liquids contained therein. This disengagement is accomplished by exerting an upward force on the external handle 4, such as that which occurs when the liquid decanter is carried by the user. When the external handle is disengaged, the plurality of pegs 20 integrally molded to opposing ends of cam shaft 7 rest within the rounded slots 21 of the arms 23 and 24 of the external handle. The pump housing 2, insulated container body 5 and base unit 6 are thus suspended about the plurality of pegs 20 and are, therefore, able to rotate freely within rounded slots 21 and no decanting of liquids takes place. The pump unit 1 is engaged when downward pressure is placed on the external handle 4 and the plurality of pegs 20 slide from rounded slots 21 to elongated slots 22 of the arms 23 and 24, and are secured therein.

When the elongated slots 22 of the arms 23 and 24 of the external handle 4 are securely engaged with the plurality of pegs 20, the pump unit 1 can be actuated and liquid may be dispensed. Pump unit 1 is actuated by the rotation of the handle by the user, such as when the user places a beverage cup under the integral spout housing 25, which extends horizontally from the pump housing 2, and pulls the external handle towards him. The external handle 4 then rotates the cam shaft 7 about the plurality of integral pegs 20. In the preferred embodiment of the present invention, an arcuate plate 9, which is eccentrically attached to the cam shaft 7, mechanically engages the vertically-movable check valve 8. As the cam shaft 7 is rotated by virtue of the rotation of the external handle 4, the arcuate plate 9 progressively depresses the vertically movable check valve 8, about its plurality of spaced-apart legs 1, into the support plate 10.

When pressure exerted by the arcuate plate is removed, the vertically-movable check valve 8 is extended into an open position through the use of a coiled spring (not shown), and free atmospheric communication is allowed between the open upper end 13 of flexible bellows unit 12 and the pump housing 2 through the plurality of spaced-apart legs 11. When the vertically-movable check valve 8 is fully depressed into the support plate 10 by pressure from the rotating arcuate plate 9 of cam shaft 7, the atmospheric communication between the bellows unit 12 and the pump housing 2 is completely restricted.

The free atmospheric communication allowed when the vertically-movable check valve 8 in an open position allows the flexible bellows unit to re-inflate after the completion of a pumping cycle, so that a new pumping cycle can begin. Likewise, when the external handle 4 rotates cam shaft 7, and the arcuate plate 9 fully depresses the vertically-movable check valve 8, the flexible bellows unit 12 is also progressively depressed by the force exerted by the arcuate plate 9. As the flexible bellows unit 12 is depressed, pressurized air, which can no longer escape through open upper end 13, is injected into the insulated container vessel 5 through the lower open end 15 of the flexible bellows unit, and the valves 16 of the external bulkhead 14.

As is well-known in this art, the injection of pressurized air into the insulated container vessel 5 creates a disequilibrium between the internal atmospheric pressure of the insulated container vessel 5 and the atmospheric pressure external to the liquid decanter. This state of disequilibrium of relative atmospheric pressures causes the liquid contained within the relatively high pressure insulated container vessel 5 to flow through hollow tube 18, the channel 42 of bulkhead 14, and hollow spout 17, into the lower, external atmospheric pressure. Such liquid flow continues until an equilibrium of the internal and external atmospheric pressures is restored.

What we claim is:

1. An air pressurized liquid decanter comprising:
    an insulated container body including a top surface, a bottom surface, an interior vessel and exterior surface;
    a base unit affixed to said bottom surface of said insulated container body;
    a pump housing attached to said top surface of said insulated container body, said pump housing having a plurality of apertures radially disposed about the circumference of said pump housing;
    an external handle affixed to the exterior of said pump housing about said plurality of apertures;
    a pump unit surrounded by said pump housing, wherein said pump unit comprises:
        a cam shaft whose opposing ends extend laterally through said radially disposed apertures of said pump housing and are affixed in rotatable engagement to said external handle;
        a check valve in mechanical communication with said cam shaft such that said check valve is vertically movable when depressed by said cam shaft;
        a support disk with a central aperture into which said check valve is affixed and which allows vertical movement of said check valve when said check valve is depressed by said cam shaft;
        a bulkhead maintained in sealing engagement with said interior vessel of said insulated container body and having a plurality of valves permitting atmospheric communication with said interior vessel;
        a flexible bellows unit having a top surface in mechanical communication with said support disk, a bottom surface in mechanical communication with said bulkhead and a flexible body wherein said top surface includes an open upper end in atmospheric communication with said check valve and said pump housing and said bottom surface has an open lower end in atmospheric communication with said interior vessel of said insulated container body through said plurality of valves in said bulkhead;
    a hollow spout in sealing engagement with said bulkhead; and
    a hollow tube having a first and a second end wherein said first end is maintained in sealing engagement with said bulkhead and said second end extends into said interior vessel of said insulated container body permitting the flow of fluid from the interior of said insulated container body, through said bulkhead and said hollow spout.

2. The air pressurized liquid decanter as claimed in claim 1, wherein said external handle is held in rotatable engagement with said cam shaft by a plurality of hollow clips.

3. The air pressurized liquid decanter as claimed in claim 1, wherein said cam shaft further comprises a pair of pegs, each of said pair of pegs being integrally molded to said opposing ends of said cam shaft.

4. The air pressurized liquid decanter as claimed in claim 3, wherein said external handle is attached in rotatable engagement to said cam shaft about said pair of pegs and secured in place by said plurality of hollow clips, each of said plurality of hollow clips including a groove integrally molded therein to cooperatively engage said pair of pegs.

5. The air pressurized liquid decanter as claimed in claim 1, wherein said vertically-movable check valve includes a plurality of spaced-apart legs which, when said vertically-movable check valve is extended in an open position, allow free atmospheric communication between said bellows unit and said pump housing.

6. The air pressurized liquid decanter as claimed in claim 1, wherein said vertically-movable check valve includes a plurality of spaced-apart legs which, when said vertically-movable check valve is fully depressed into said support plate by said cam shaft, restrict said atmospheric communication.

7. The air pressurized liquid decanter as claimed in claim 1, further comprising a lock plate in slidable engagement with an integral groove in the upper surface of said pump housing, wherein said lock plate moves across said integral groove and mechanically engages with said cam shaft preventing the rotational movement of said cam shaft.

8. The air pressurized liquid decanter as claimed in claim 1, wherein said external handle includes a first arm and a second arm and a contiguous rounded and elongated slot on each of said first and second arms.

9. The air pressurized liquid decanter as claimed in claim 1, wherein said cam shaft includes an arcuate plate eccentrically attached to said cam shaft.

10. The air pressurized liquid decanter as claimed in claim 9, wherein said cam shaft is comprised of a two-piece assembly including a first piece and a second piece, wherein said first piece of said two-piece assembly includes an integral block which affixes to a slot integrally connected with said second piece of said two-piece assembly.

11. The air pressurized liquid decanter as claimed in claim 1, wherein said interior vessel of said insulated container body is comprised of a rigid, hollow vessel surrounding an insulating material.

12. The air pressurized liquid decanter as claimed in claim 1, wherein said interior vessel of said insulated container body is comprised of a rigid, hollow vessel surrounding a double-walled glass vacuum bottle.

13. The air pressurized liquid decanter as claimed in claim 12, wherein said base unit further comprises a flexible, shock absorbing plug in mechanical engagement with said double walled glass vacuum bottle and said base unit.

14. The air pressurized liquid decanter as claimed in claim 1, wherein said pump housing further comprises an integral spout housing extending horizontally from said pump housing.

15. A method for dispensing liquid from an air pressurized liquid decanter comprising the steps of constructing a pump housing having a plurality of apertures radially disposed about the circumference of said pump housing;

placing a cam shaft having opposing ends within said pump housing and inserting said opposing ends of said cam shaft through said plurality of apertures;

attaching an external handle to the exterior of said pump housing by affixing said opposing ends of said cam shaft to said external handle about said plurality of radially disposed apertures;

placing a check valve into the central aperture of a support disk so that said check valve is allowed to move vertically within said central aperture of said support disk;

inserting said check valve and said support disk into said pump housing so that said check valve is in mechanical communication with said cam shaft;

placing a flexible bellows unit with open upper and lower ends within said pump housing so that said flexible bellows unit is maintained in mechanical communication with said support disk and said open upper end of said flexible bellows unit is maintained in atmospheric communication with said check valve and the interior of said pump housing;

placing a bulkhead including a plurality of valves and channels within said pump housing so that said flexible bellows unit is maintained in mechanical and atmospheric communication with said open lower end of said flexible bellows unit;

attaching a spout assembly in sealing engagement with said bulkhead;

attaching the first of two ends of a hollow tube in sealing engagement with said bulkhead;

introducing a fluid into the insulated internal container vessel of a container body having an open upper end;

attaching said pump housing to said open upper end of said container body so that said bulkhead is maintained in sealing engagement with said insulated internal container vessel, atmospheric communication is established between said open lower end of said flexible bellows unit and said insulated internal container vessel through said plurality of valves of said bulkhead and said second end of said hollow tube is inserted into said insulated internal container vessel to engage said fluid; and dispensing said fluid by rotating said external handle to index said cam shaft within said pump housing about said plurality of radially disposed apertures to vertically depress said check valve within said central aperture of said support disk to restrict atmospheric communication with the open upper end of said flexible bellows unit and depress said flexible bellows unit to inject pressurized air through said open lower end of said flexible bellows unit through plurality of valves of said bulkhead and into said insulated internal container vessel of said container body forcing said fluid residing in said insulated internal container vessel into said second end of said hollow tube and through said hollow tube, said channels of said bulkhead and said hollow spout.

* * * * *